UNITED STATES PATENT OFFICE.

HERMANN REY, OF BASEL, SWITZERLAND, ASSIGNOR TO THE FIRM OF SOCIETY OF CHEMICAL INDUSTRY IN BASLE, OF BASEL, SWITZERLAND.

DEHYDRATING HYDRATED HYDROSULFITES.

987,170.

Specification of Letters Patent.  Patented Mar. 21, 1911.

No Drawing.

Application filed August 9, 1910. Serial No. 576,324.

*To all whom it may concern:*

Be it known that I, HERMANN REY, a citizen of the Swiss Republic, and resident of Basel, Switzerland, have invented a new Process for Dehydrating Hydrated Hydrosulfites, of which the following is a full, clear, and exact specification.

The salts of hydrosulfurous acid which can be obtained in a form containing water of crystallization by precipitation from their concentrated aqueous solutions by means of alcohol or otherwise, are known to be very unstable. In order that they may be converted into a stable commercial form, the water of crystallization must be withdrawn, for which purpose very varied proposals have already been made. Thus, hot alcohol or hot caustic soda lye has been used as a dehydrating agent. It is also known that the dehydration may be effected by long heating of the precipitated salt with the mother liquor, or by heating the wet salt by itself or with toluene or the like, or it may be dried directly by placing it, in small quantities, on a previously heated plate, or by heating the dried hydrosulfite still containing its water of crystallization, in a vacuum or in a current of indifferent gas. To all these methods there are objections; some are very tedious, and in others the necessary prolonged heating at a high temperature presents a danger to the success of the operation, since sodium hydrosulfite even in absence of air can decompose under certain conditions at high temperatures into thiosulfate and pyrosulfite.

According to the present invention, a sodium alcoholate, made by dissolving sodium in methyl alcohol or ethyl alcohol, may be used as a very suitable dehydrating agent for hydrosulfites containing water of crystallization. The reaction proceeds spontaneously without any external application of heat, so that the dehydration can be completed in a very short time. Herein resides an important technical effect as compared with all the processes hitherto known, since in the case of substances so easily decomposed as hydrosulfites, the most rapid possible working is a primary condition of success.

The present process has nothing in common with that described in French patent specification No. 341718. Although in an example of the specification to the patent of addition No. 3907 to the said French patent, a mixture of aqueous caustic soda lye with some spirit is used, this mixture behaves quite differently from anhydrous sodium ethylate. In order to obtain a dehydration by means of the said mixture, heating for a long time at 65° C. is necessary, whereas sodium ethylate produces the same effect almost instantaneously without any warming.

The process may be practiced in different manners, and the following examples illustrate it, the parts being by weight:

Example 1: 15 parts of sodium are dissolved in 300 parts of absolute alcohol. Into the mixture of sodium ethylate and alcohol thus obtained are stirred 60 parts of sodium hydrosulfite, containing water of crystallization, in the form of a dry powder or of an alcoholic paste. The decomposition into anhydrous hydrosulfite, according to the equation:

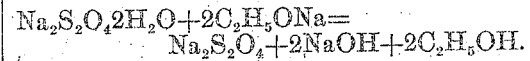

$$Na_2S_2O_4 \cdot 2H_2O + 2C_2H_5ONa = Na_2S_2O_4 + 2NaOH + 2C_2H_5OH.$$

occurs instantaneously in the mass as the hydrosulfite is introduced. The mixture is filtered at ordinary temperature and the solid washed first with absolute alcohol, then with absolute ether and dried in thin layers at 40-45° C. The drying operation of the salt thus obtained is so rapid and the salt is so stable that air need not be excluded. The yield is quantitative.

Example 2: Sodium hydrosulfite which has been precipitated by alcohol and washed with absolute alcohol, the amount of the salt corresponding with 60 parts of $Na_2S_2O_4 \cdot 2H_2O$, is mixed in the form of the alcoholic magma which is left on the filter, with 44 parts of amorphous sodium ethylate free from alcohol, or with 104 parts of the alcohol compound $C_2H_5ONa \cdot 2C_2H_6O$; the admixture is made while stirring. Heat is developed and may be kept at low temperature by external cooling, while the crystallized salt is immediately changed into the anhydrous salt. The further working up of the salt may be similar to that described in Example 1.

Example 3: 60 parts of sodium hydrosulfite containing water of crystallization are stirred with 400–500 parts of absolute methyl or ethyl alcohol, and 15 parts of sodium are introduced into this mixture while it is cooled. As soon as all the sodium has disappeared, the mass is filtered and further worked up as described in Example 1.

What I claim is:

The process of dehydrating hydrated hydrosulfites, which consists in treating hydrated hydrosulfites with sodium alcoholate.

In witness whereof I have hereunto signed my name this 12th day of July 1910, in the presence of two subscribing witnesses.

HERMANN REY.

Witnesses:
  GEO. GIFFORD,
  AMAND BRAUN.